No. 853,974. PATENTED MAY 21, 1907.
G. W. HAYDEN.
EXPANSION JOINT.
APPLICATION FILED DEC. 9, 1905.

WITNESSES
Harvey L. Lechner
Archworth Martin

INVENTOR
George W. Hayden
by attys
Synnestvedt & Carpenter

UNITED STATES PATENT OFFICE.

GEORGE W. HAYDEN, OF OAK PARK, ILLINOIS, ASSIGNOR TO CRANE COMPANY, OF CHICAGO, ILLINOIS, A CORPORATION OF ILLINOIS.

EXPANSION-JOINT.

No. 853,974.     Specification of Letters Patent.     Patented May 21, 1907.

Application filed December 9, 1905. Serial No. 291,070.

*To all whom it may concern:*

Be it known that I, GEORGE W. HAYDEN, a citizen of the United States, residing at Oak Park, in the State of Illinois, have invented certain new and useful Improvements in Expansion-Joints, of which the following is a specification.

The invention relates to expansion joints for pipes in which the members are held in telescoping engagement to provide for the lengthening and shortening of the pipe resulting from pressure in the pipe and the expansion and contraction due to heat. The objects of the invention are; to provide an improved balanced joint or one in which a yielding stress is applied in opposition to the force of the liquid tending to separate the parts, and to provide an arrangement of parts whereby the yielding holding means is applied uniformly so that the telescoping members may slide upon each other without binding. One form of the invention is illustrated in the accompanying drawings, in which—

Figure 1:
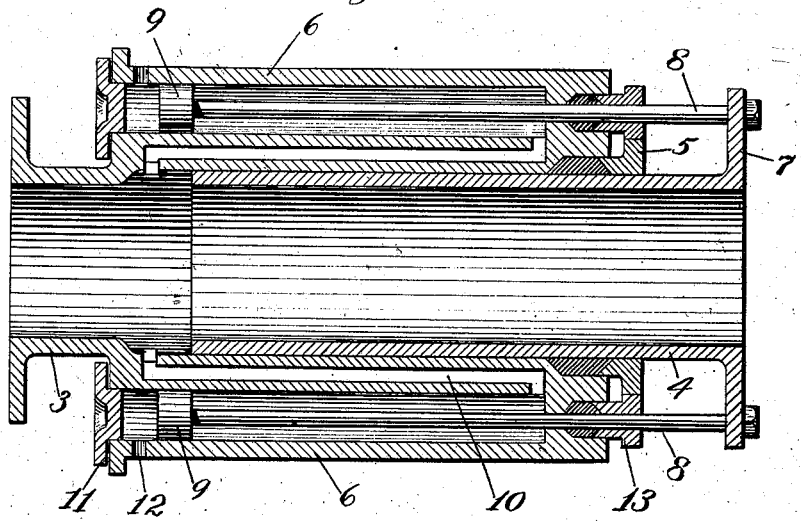
Figure 1 is a longitudinal section through the center of the joint.
Figure 2:
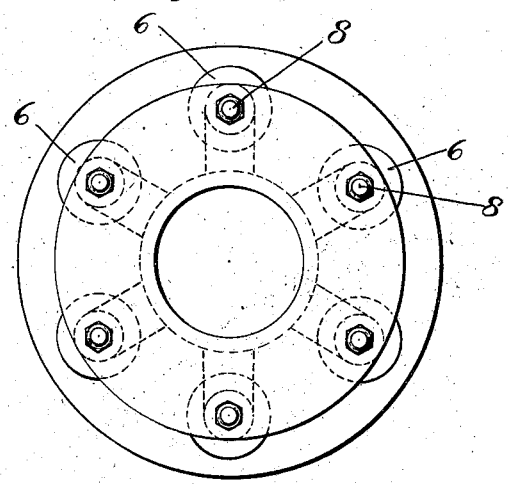
Figure 2 is a view of the right hand end of the joint as shown in Figure 1.

In order to hold the telescoping parts of the joint in yielding engagement I preferably employ a plurality of cylinders spaced about the periphery of one of the telescoping members and secured thereto, and a plurality of co-operating pistons on the other member arranged to be operated by fluid pressure and oppose the pressure in the pipe tending to separate the telescoping members. My invention, however, is not restricted to fluid balancing means, for it is apparent that other yielding means might be applied.

As shown in the drawings, 3 and 4 are the telescoping members, which members are provided with flanges which are adapted to be secured to the sections of pipe between which the joint is to be placed. In order to make a tight joint the stuffing box 5 is used. The means shown for balancing the joint consists of a plurality of cylinders 6 arranged at uniform intervals about the circumference of one of the telescoping members. As shown, these cylinders are integral with one of the members, but if desired, such cylinders may be made separate from the telescoping member and secured thereto in any suitable manner. It is also apparent that the number of the cylinders might be varied in order to suit varying conditions as to the size of the pipe, the only consideration being that the holding means be applied uniformly about the circumference of the joint and that the combined area available for fluid pressure be sufficient to properly hold the telescoping sections in place. The member 4 is provided with a flange 7, to which flange is secure a plurality of piston rods 8 each carrying at its end a piston 9. Connection is made to the cylinders from the pipe by means of the ports 10. The ends of the cylinders are closed by means of heads 11 and connection is made from the left hand end of the cylinders to the atmosphere by means of the openings 12. Each piston rod 8 is made steam tight by the stuffing boxes 13. It will be seen from the above construction that the holding means by their uniform spacing about the joint provide a balancing force which is applied symmetrically to the telescoping parts, whereby there is no binding of such parts in their sliding engagement.

Having thus described my invention and illustrated its use, what I claim as new and desire to secure by Letters Patent, is the following:

1. In combination an expansion joint comprising two telescoping coupling members, one of which has a plurality of backwardly extending rods paralleling the members and means whereby the rods may be held yieldingly in one direction and the other coupling member in the other direction such means being of sufficient strength to counterbalance the tendency of the telescoping members to separate when steam is admitted and so arranged as to prevent binding of the telescoping parts.

2. In combination an expansion joint comprising two flanged telescoping coupling members, one of which has a plurality of rods spaced uniformly thereabout and parallel to the members, and means co-operating with the rods whereby the members are held yieldingly from longitudinal expansive movement, with a force substantially equal to the force normally tending to separate the telescoping members when steam is admitted.

3. In combination, an expansion joint comprising two telescoping coupling members, a plurality of backwardly extending rods provided with pistons connected to one of the members, a corresponding number of fluid pressure cylinders connected to the other member and having communication with the atmosphere on the rear side of the pistons and to a source of fluid pressure on the front side whereby the tendency of the joint to expand is resisted.

4. In combination, an expansion joint comprising two telescoping coupling members, a plurality of backwardly extending rods provided with pistons having a combined area substantially equal to the area of the coupling members connected to one of the members, a corresponding number of fluid pressure cylinders connected to the other member and having communication with the atmosphere on the rear side of the pistons and to a source of fluid pressure on the front side whereby the tendency of the joint to expand is yieldingly resisted.

5. In combination an expansion joint comprising two telescoping members, a plurality of fluid pressure cylinders on one of the members having passages opening into the joint, and a corresponding plurality of pistons having a combined area substantially equal to the area of the coupling members connected to the other member whereby the members are held in telescoping engagement.

6. In combination a telescoping joint comprising telescoping members, one of such members being counter bored, cylinders mounted on this member and having passages leading to the counterbores, pistons in the cylinders and connections between the pistons and other telescoping member.

7. In combination an expansion joint comprising telescoping members, a plurality of fluid pressure cylinders on one of the parts having passages opening into the joint and a corresponding plurality of pistons connected to the other part whereby the members are held in telescoping engagement.

In testimony whereof I have hereunto signed my name in the presence of the two subscribed witnesses.

GEORGE W. HAYDEN.

Witnesses:
PAUL CARPENTER,
ALBERT GRANT MILLER.